May 14, 1940.     A. Y. DODGE     2,200,596
HYDRAULIC CLUTCH
Original Filed Dec. 2, 1935    2 Sheets-Sheet 1

INVENTOR.
ADIEL Y. DODGE
BY McConkey & Booth
ATTORNEYS.

INVENTOR.
ADIEL Y. DODGE
BY McConkey & Booth
ATTORNEYS.

Patented May 14, 1940

2,200,596

UNITED STATES PATENT OFFICE 2,200,596

HYDRAULIC CLUTCH

Adiel Y. Dodge, Rockford, Ill.

Application December 2, 1935, Serial No. 52,530
Renewed August 14, 1939

8 Claims. (Cl. 60—54)

This invention relates to hydraulic clutches and more particularly to clutches in which the liquid flow is toroidal.

It has been proposed to use hydraulic clutches in various places in connection with shiftable gears or the like, but a great deal of difficulty has been encountered in shifting the gears due to the fact that the hydraulic clutches transmitted torque at all times. Therefore, friction clutches were employed in order to disconnect the power source from the shiftable gears to facilitate shifting, or various other expedients were resorted to, none of which was entirely satisfactory.

It is accordingly one of the objects of the invention to provide a hydraulic clutch which will transmit very little or no torque at low speeds of the driving element but which will transmit full torque at slightly higher speeds.

Another object of the invention is to provide a hydraulic clutch which will slip when subjected to torque resistances in excess of the applied torque.

One arrangement for carrying out the above and other objects of the invention includes a vaned rotor and a vaned impeller in which the areas of the flow passages are correctly proportioned so that the area in the impeller is larger than that in the rotor. Preferably the impeller includes fixed vanes at its inlet end and pivoted vanes at its outlet end and the rotor may, if desired, be provided with both pivoted inlet and outlet vanes and/or with a gate to restrict the hydraulic flow therethrough. I have found that a hydraulic clutch of this character will transmit very little torque at impeller speeds of 500 R. P. M. or less, will transmit full torque with very little slip at impeller speeds of 1200 R. P. M. or more and will slip relatively freely when the torque load on the rotor is in excess of 125% of the applied torque on the impeller.

Other objects and advantages including novel subcombinations and particular structural features will be apparent from the following description when read in connection with the accompanying drawings, in which.

Figures 1, 2:
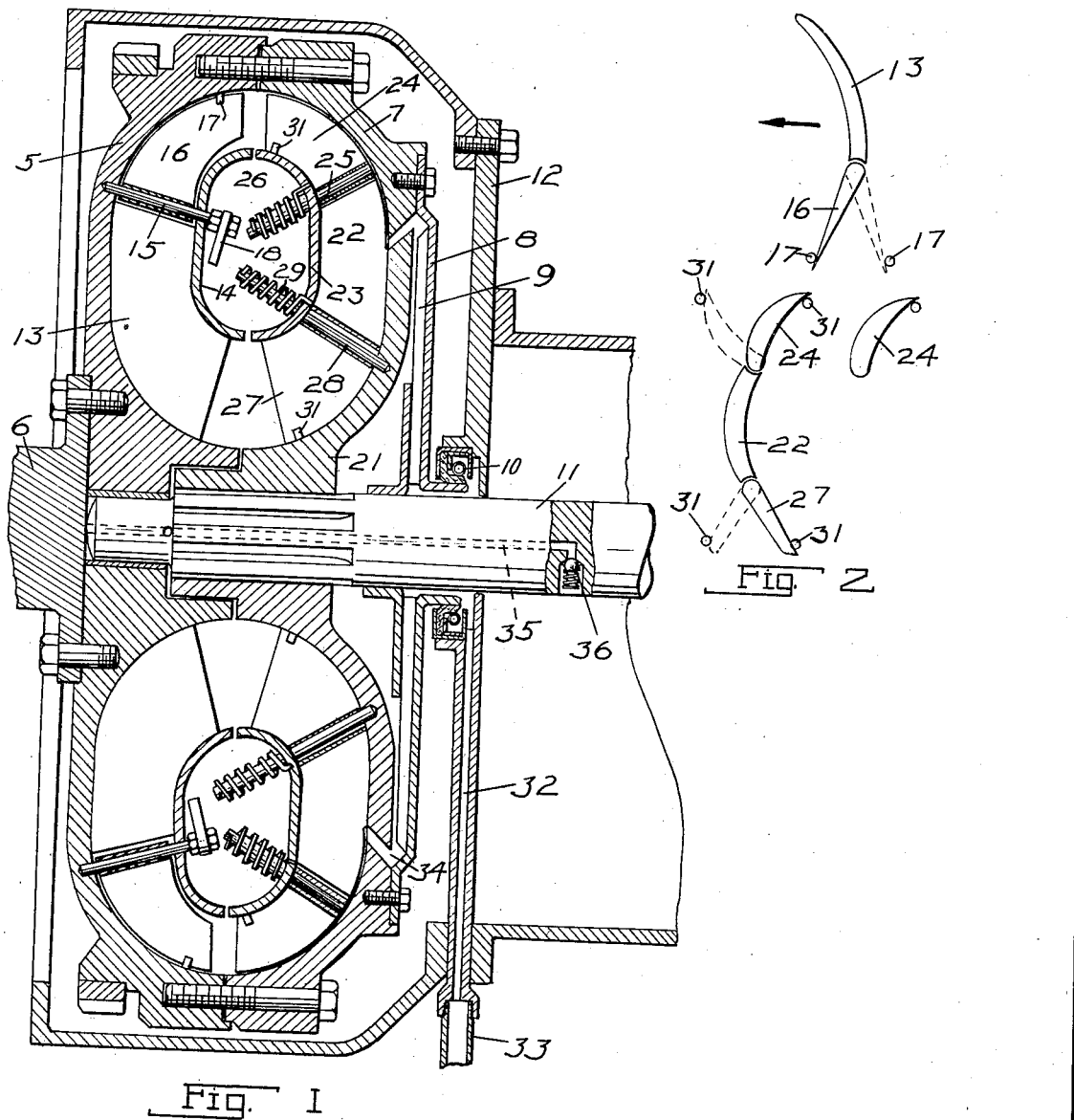
Figure 1 is a central section of a hydraulic clutch embodying the invention.
Figure 2 is a diagrammatic view of the impeller and rotor vanes of the clutch of Figure 1.

The hydraulic clutch of Figures 1 and 2 is of a type particularly adapted to connect an engine to a selective gear transmission and comprises an annular impeller housing 5 connected to a driving shaft 6 which may be a suitable engine shaft or an extension thereof. The housing 5 is shaped to provide on its inner surface an annular semi-toroidal cavity and has secured to its open face an annular ring 7 whose inner surface forms a continuation of the inner surface of the housing 5. The impeller housing is completed by a disc 8 formed with a plurality of radial passages 9 separated by vanes or the like for a purpose to appear later. The disc 8 has a pair of flanges at its inner edge sealing respectively against a driven shaft 11 and a fixed wall 12 of an outer casing which houses the entire clutch, a packing 10 being provided if desired to form a seal between the flange and the outer casing.

The impeller housing 5 has rigidly secured thereto a series of fixed impeller vanes 13 which are secured at their inner edges to an annular core member 14. A pivot pin 15 is journalled at its opposite ends in the housing 5 and core member 14 adjacent the outer edge of each of the vanes 13 and carries a pivoted impeller vane 16, suitable stops carried by the housing 5 being provided as indicated at 17 in Figure 2 to limit pivotal movement of the vanes 16.

The pivotal positions of the vanes 16 are determined by the force of the circulating liquid acting thereon and by weights 18 secured to the pins 15. Centrifugal force on the weights 18 tends to turn the vanes 16 forwardly with respect to the direction of rotation of the impeller and the fluid reaction tends to turn them rearwardly so that the final position of the vanes is determined by the balance between these forces.

A rotor is arranged to cooperate with the impeller and includes a hub 21 secured to the driven shaft 11 within the housing formed by the parts 5, 7 and 8. The hub 21 is formed with an inside contour forming a smooth continuation of the inner surfaces of parts 5 and 7 to complete the toroidal cavity and has rigidly secured thereto a series of fixed vanes 22 which carry at their inner edges a core member 23 complementary to the core member 14.

A series of vanes 24 is mounted on pins 25 journalled in the core member 23 adjacent the inlet edges of the vanes 22 and a suitable torsion spring 26 is provided to urge the pins 25 and vanes 24 rearwardly with respect to the direction of rotation of the impeller. A similar series of vanes 27 is similarly pivoted on pins 28 adjacent the discharge edges of the vanes 22, springs 29 being provided to urge the vanes 27 rearwardly with respect to the direction of rotation of the impeller. Suitable stop pins 31 are preferably provided on the hub 21 to limit the angular movement of the vanes 24 and 27 as indicated in Figure 2. It will be noted that the vanes 24 and a portion of the vanes 22 overlie the ring 7. This arrangement tends to reduce fluid friction and in addition provides a lighter rotor construction.

In operation of the device as so far described, the shaft 6 is driven by a suitable source of power to rotate the impeller and cause liquid to flow radially outward in the passages formed by the impeller vanes 13 and 16, the housing 5 and the core member 14. The liquid thus circulated passes inwardly through the rotor, its velocity being slightly increased due to the decreased area of the rotor, and again outwardly in the impeller to follow a toroidal path. In this way the rotor will be driven by the impeller through the liquid.

It will be noted, particularly from Figure 2, that with the impeller turning in the direction of the arrow, fluid reaction on the pivoted vane 16 tends to move it into its dotted line position and fluid reaction on the rotor vanes 24 and 27 tends to turn them into their dotted line positions. Since at relatively low speeds the weights 18 exert only a small force on the vanes 16, they will move relatively freely into their dotted line positions to cause liquid to leave the impeller with a relatively high axial component and a low circumferential component. This action coupled with the action of the pivoted rotor vanes and the low velocity large area impeller results in transmission of very little torque at low impeller speeds, i. e., speeds less than 500 R. P. M. As the impeller speed increases, the weights 18 become effective to move the vanes 16 toward their full line position in Figure 2 thus increasing the circumferential component of liquid leaving the impeller and increasing the driving torque on the rotor. At impeller speeds of the magnitude of 1200 R. P. M. or more the clutch will transmit full engine torque with very little slip. When the rotor is subjected to reaction torque or load in excess of the driving torque on the impeller and particularly when the load reaches 125% or more of the driving torque the pivoted vanes will yield to permit relatively free slipping between the impeller and the rotor.

These characteristics are highly desirable for use with shiftable gears whether the shift is manual or automatic or whether the shifting is performed by sliding gears into and out of mesh or by engaging and disengaging clutches.

During operation it is desirable to keep the clutch full of liquid, to provide room for expansion due to heating, and, in most cases, to cool the liquid. For these purposes the clutch, according to the present invention, is provided with a passage 32 which may be formed in the casing wall 12 and which communicates with the inner end of the radial passages 9. The passage 32 is connected by a pipe 33 with a liquid pump or other suitable source of liquid under pressure. Liquid entering the passages 9 will be forced outwardly by its own pressure and by centrifugal force and into the clutch passages through suitable openings between the impeller ring 7 and the rotor hub.

Liquid may circulate out of the clutch between the impeller and rotor and into a bore 35 in the driven shaft 11. The bore opens at its end into the stationary casing enclosing the transmission and its outlet is controlled by a spring pressed valve 36. Liquid draining into the casing past the valve 36 may be returned to the pump which is connected to the pipe 33, a suitable cooling radiator being provided, if desired, to cool the liquid prior to its return to the clutch.

Figure 3:
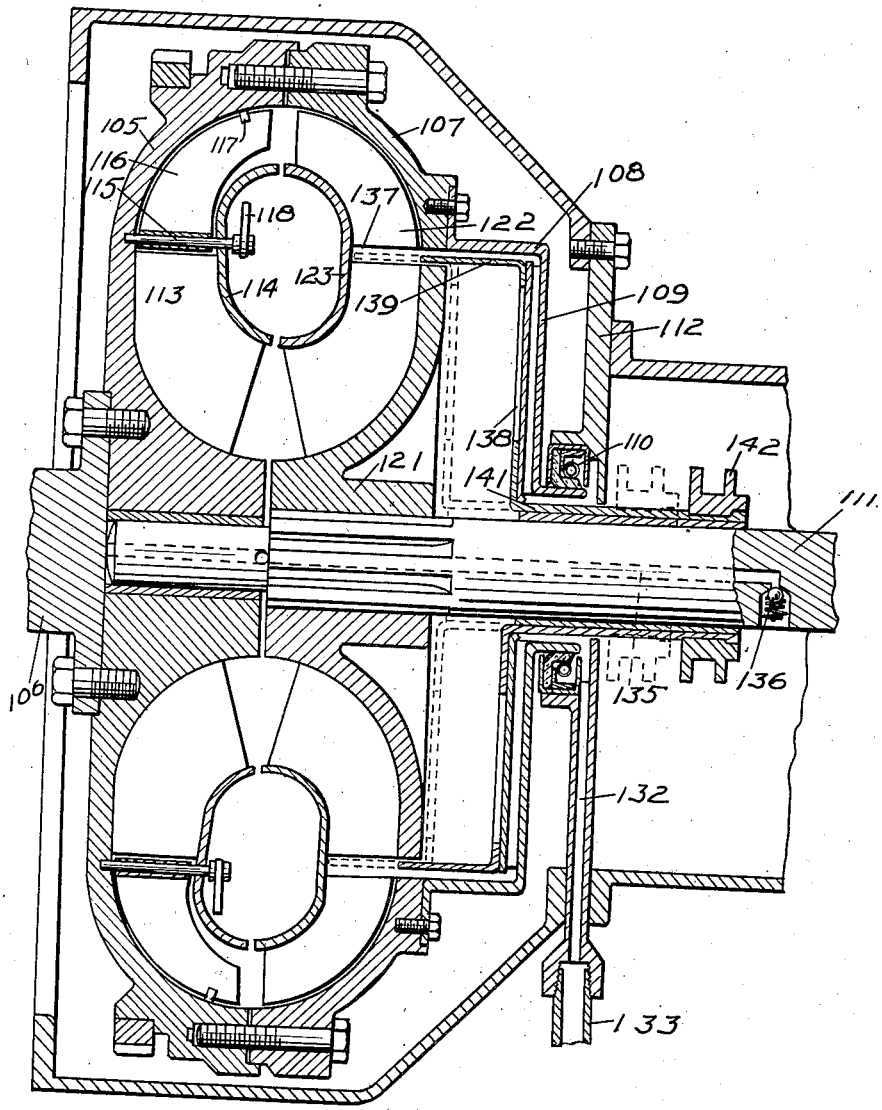
Figure 3 is a central section of a modified construction.

Figure 3 illustrates a modified construction, parts therein corresponding to like parts in Figures 1 and 2 being designated by the same reference numbers plus 100. In Figure 3 the rotor is shown as having only a set of fixed vanes with a gap 137 in the central portion thereof although it will be apparent that pivoted end vanes similar to the vanes 24 and 27 of Figures 1 and 2 could be provided if desired. It will be understood that the same relative flow areas of the impeller and rotor as described in connection with Figures 1 and 2 are maintained in the clutch of Figure 3. The housing 108 is offset axially and a gate member 138 is arranged therein. The gate member includes an axially extending flange 139 which is adapted to move into the space 137 and a sleeve 141 which is slidably mounted on the driven shaft 111.

In order to control the gate member, the outer end of the sleeve 141 carries a collar 142 adapted to receive a shifting yoke, not shown, which may be actuated by a lever or a pedal similar to the usual clutch pedal.

What it is desired to restrict or cut off the flow of liquid in the clutch, the gate may be shifted to its dotted line position in which the flange 139 enters the space 137 and restricts or cuts off the circulation of liquid through the rotor. In this position substantially no torque will be transmitted by the clutch and any desired shifting of gears may be accomplished readily. When the gate 138 is shifted to its full line position liquid may flow through the impeller and rotor freely and the clutch will operate to transmit torque in substantially the same manner as described in connection with Figures 1 and 2.

While two embodiments of the invention have been shown and described, it will be apparent that many changes might be made therein. It is accordingly not intended that the scope of the invention shall be limited to the forms shown or otherwise than by the terms of the appended claims.

What is claimed is:

1. A hydraulic clutch comprising an annular impeller casing having vanes mounted in substantially one-half thereof, a rotor mounted in said impeller casing and rotatable relatively thereto, said rotor having a plurality of vanes and an annular core member secured to the inside of said vanes, a substantial portion of the outside edges of the rotor vanes being unsupported and lying adjacent the inside of said impeller casing.

2. A hydraulic clutch comprising an impeller and a vaned rotor providing a fluid circulating passage, a series of vanes fixedly mounted on the impeller at the inlet end thereof, a series of vanes pivotally mounted on the impeller at the outlet end thereof, and centrifugal means connected to said last named vanes to move them about their pivots.

3. A hydraulic clutch comprising an impeller and a vaned rotor providing a fluid circulating passage, a series of rigid vanes fixedly mounted at the inlet end of the impeller, a series of rigid vanes pivotally mounted adjacent the outlet ends of said first vanes and extending toward the impeller outlet, stops carried by the impeller for limiting the movement of the pivoted vanes, and centrifugal weights connected to the pivoted vanes to urge said vanes in one direction about their pivotal axes in response to centrifugal force.

4. A hydraulic clutch comprising a vaned impeller and a vaned rotor providing a liquid passage, the vanes on said rotor including fixed portions and eccentrically pivoted portions pivoted to the rotor adjacent the inlet end thereof to move in one direction in response to fluid pressure, and yielding means to urge said portions in the opposite direction.

5. A hydraulic clutch comprising a vaned impeller and a vaned rotor providing a liquid passage, the vanes on said rotor including pivoted portions adjacent both ends and a fixed portion intermediate the pivoted portions.

6. A hydraulic clutch comprising a vaned impeller having fixed inlet vanes and pivoted outlet vanes, centrifugal means to urge the pivoted outlet vanes in one direction about their pivots, a vaned rotor having pivoted inlet and outlet vanes with fixed intermediate vanes, and resilient means for urging the inlet and outlet vanes in one direction about their pivots.

7. A hydraulic clutch comprising, an annular impeller casing, fixed vanes secured to a portion of said casing, vanes pivoted to said casing adjacent the outlet end of the fixed vanes, a rotor mounted in the impeller casing and rotatable relatively thereto, said rotor carrying a set of fixed vanes and a set of pivoted vanes adjacent each end of the fixed vanes, at least a portion of the outside edges of the rotor vanes being unsupported and lying adjacent the inside of the impeller casing, said vanes and casing forming fluid circulating passages, means in the casing forming a fluid inlet communicating with said passages, a fluid outlet communicating with said passages, and a pressure responsive valve normally closing said outlet but yieldable in a response to a predetermined pressure therein.

8. A hydraulic clutch comprising an impeller and a vaned rotor providing a fluid circulating passage, a series of vanes fixedly mounted on the impeller, a series of vanes eccentrically pivoted on the impeller adjacent its outlet end to be urged in one direction by the pressure of fluid thereon, and speed responsive means to urge said pivoted vanes in the other direction.

ADIEL Y. DODGE.